(12) United States Patent
Min

(10) Patent No.: US 11,926,279 B2
(45) Date of Patent: Mar. 12, 2024

(54) ROOF AIRBAG APPARATUS FOR A VEHICLE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/879,861

(22) Filed: Aug. 3, 2022

(65) Prior Publication Data

US 2023/0056934 A1  Feb. 23, 2023

(30) Foreign Application Priority Data

Aug. 17, 2021 (KR) .................. 10-2021-0108358
Oct. 1, 2021 (KR) .................. 10-2021-0131211
Oct. 18, 2021 (KR) .................. 10-2021-0138540

(51) Int. Cl.
*B60R 21/214* (2011.01)
*B60R 21/231* (2011.01)
*B60R 21/233* (2006.01)
*B60R 21/2338* (2011.01)

(52) U.S. Cl.
CPC .......... *B60R 21/214* (2013.01); *B60R 21/233* (2013.01); *B60R 21/2338* (2013.01); *B60R 2021/23161* (2013.01)

(58) Field of Classification Search
CPC ........ B60R 21/214; B60R 2021/23386; B60R 21/231
See application file for complete search history.

(56) References Cited

U.S. PATENT DOCUMENTS

| | | | | |
|---|---|---|---|---|
| 3,897,961 A | * | 8/1975 | Leising | B60R 21/232 280/730.1 |
| 5,470,103 A | * | 11/1995 | Vaillancourt | B60R 21/232 280/730.2 |
| 10,407,018 B2 | * | 9/2019 | Sundararajan | B60R 21/2338 |
| 10,625,701 B2 | * | 4/2020 | Cho | B60R 21/214 |
| 10,688,955 B2 | * | 6/2020 | Shin | B60R 21/214 |
| 10,836,340 B2 | * | 11/2020 | Obayashi | B60R 21/2338 |
| 10,857,965 B2 | * | 12/2020 | Abe | B60R 21/214 |
| 10,864,882 B2 | * | 12/2020 | Obayashi | B60R 21/214 |
| 10,974,685 B2 | * | 4/2021 | Kwon | B60R 21/239 |
| 11,186,246 B2 | * | 11/2021 | Min | B60R 21/232 |
| 11,351,949 B2 | * | 6/2022 | Fischer | B60R 21/216 |
| 11,639,148 B2 | * | 5/2023 | Jeong | B60R 21/214 280/730.1 |
| 2019/0161048 A1 | * | 5/2019 | Thomas | B60R 21/264 |

(Continued)

FOREIGN PATENT DOCUMENTS

| | | |
|---|---|---|
| CN | 111469796 A | 7/2020 |
| KR | 1020120033743 A | 4/2012 |

*Primary Examiner* — Drew J Brown
*Assistant Examiner* — Tiffany L Webb
(74) *Attorney, Agent, or Firm* — Novo TechIP International PLLC

(57) ABSTRACT

The present disclosure describes a roof airbag apparatus for mobility which protects the occupant seated in the cabin in such a manner that the roof airbag is deployed downward from the cabin roof, and safely protects the occupant from impact in such a manner that the occupant is securely restrained by the airbag as the deployment shape of the airbag is maintained.

20 Claims, 7 Drawing Sheets

(56) References Cited

U.S. PATENT DOCUMENTS

2019/0217804 A1\* 7/2019 Cho .................. B60R 21/233
2020/0139923 A1\* 5/2020 Ostling ............... B60R 21/233
2021/0197748 A1\* 7/2021 Jeong ................ B60R 21/2338

\* cited by examiner

ROOF AIRBAG APPARATUS FOR A VEHICLE

CROSS-REFERENCE TO RELATED APPLICATIONS

The present application claims the benefits of priority to Korean Patent Application Number 10-2021-0108358 filed on Aug. 17, 2021, Korean Patent Application Number 10-2021-0131211 filed on Oct. 1, 2021, and Korean Patent Application Number 10-2021-0138540 filed on Oct. 18, 2021, the entire disclosure of which is incorporated herein by reference.

BACKGROUND

1. Technical Field

The present disclosure relates to a roof airbag apparatus for a vehicle, which is capable of protecting an occupant seated in the cabin in such a manner that the roof airbag is deployed downward from the cabin roof.

2. Discussion of Related Art

A vehicle typically has safety devices to safely protect the occupant from a collision, rollover, or other accident, such as seat belts that restrain a body of the occupant and airbags that reduce the impact of the occupant resulting from getting bumped on the vehicle. These airbags are diversely mounted on different areas of the vehicle depending on the need, for example, the driver's airbag on a steering wheel, the passenger's airbag on a dashboard of a passenger seat, and the like.

Meanwhile, the vehicle is divided into a front cabin for front seat occupants and a rear cabin for rear seat occupants, with the vehicle collision causing the rear seat occupants to move forward by inertia, which results in a collision between the occupants of the cabin.

Particularly, autonomous driving is vehicles are increasing in recent years, and with the autonomous driving vehicle, the seat positions are configured to vary in 360-degree directions. Accordingly, the front and rear occupants are to be seated to face each other, causing injury by the impact between the occupants in the event of a vehicle collision in the situation where the front and rear occupants face each other.

The foregoing explained as the background is intended merely to aid in the understanding of the background of the present disclosure, and is not intended to mean that the present disclosure falls within the purview of the related art that is already known to those skilled in the art.

SUMMARY

The present disclosure has been proposed to solve the above problem, and an object of the present disclosure is to provide a roof airbag apparatus for a vehicle that protects the occupant seated in the cabin in such a manner that the roof airbag is deployed downward from the cabin roof, and safely protects the occupant from impact as the deployment shape of the airbag is maintained.

The roof airbag apparatus for a vehicle, to achieve the object, according to the present disclosure includes: a first cushion portion connected to a cabin roof and deployed downward from the cabin roof when inflated; a second cushion portion connected to the cabin roof in a manner that is spaced apart from the first cushion portion and deployed downward from the cabin roof when inflated; and a third cushion portion configured to maintain a deployment shape of the first cushion portion and the second cushion portion when inflated, by being connected in communication with the first cushion portion and the second cushion portion in a manner that is extended therebetween in a facing direction of the first cushion portion and the second cushion portion.

The third cushion portion, when inflated, may be formed longer than a separation distance between the first cushion portion and the second cushion portion in the cabin roof.

The third cushion portion may be connected in communication with edge ends of the first cushion portion and the second cushion portion.

Connection areas between the first cushion portion and the third cushion portion and between the second cushion portion and the third cushion portion may be provided in such a manner that a rim is dented inward and thus a deflection guide is formed therewith.

The roof airbag apparatus for mobility may further include: a first tether connected to the cabin roof by one end thereof and connected to the third cushion portion toward the first cushion portion by the other end thereof; and a second tether connected to the cabin roof by one end thereof and connected to the third cushion portion toward the second cushion portion by the other end thereof.

The roof airbag apparatus for mobility may further include a third tether connected to the cabin roof by one end thereof and connected to the third cushion portion between the first tether and the second tether by the other end thereof.

The roof airbag apparatus for mobility may further include: a first hug tether mounted on the cabin roof in a manner that is spaced apart from the first cushion portion and extended in a manner that encloses an inner side of the first cushion portion; and a second hug tether mounted on the cabin roof in a manner that is spaced apart from the second cushion portion and extended in a manner that encloses an inner side of the second cushion portion.

The first hug tether may be formed to enclose the inner side of the first tether and connected thereto, and the second hug tether may be formed to enclose the inner side of the second tether and connected thereto.

The first hug tether, while enclosing the inner side of the first cushion portion, may be extended toward one side in such a manner that the width thereof becomes gradually wider and mounted on the cabin roof by both ends thereof, and the second hug tether, while enclosing the inner side of the second cushion portion, may be extended toward the other side in such a manner that the width thereof becomes gradually wider and mounted on the cabin roof by both ends thereof.

The roof airbag apparatus for mobility may further include: a first diaphragm cushion deployed with a shape blocking the first cushion portion from the outer side of the first cushion portion; and a second diaphragm cushion deployed with a shape blocking the second cushion portion from the outer side of the second cushion portion.

The first diaphragm cushion and the second diaphragm cushion may be provided in such a manner that a fill chamber is deployed in a gas-filled shape along the rim thereof and in such a manner that a non-deploying dead zone with no gas-filling in the center thereof is formed.

The roof airbag apparatus for mobility may further include: a first diaphragm tether connected to the cabin roof by one end thereof and connected to a lower end of the first diaphragm cushion by the other end thereof; and a second diaphragm tether connected to the cabin roof by one end thereof and connected to a lower end of the second diaphragm cushion by the other end thereof.

The first diaphragm tether may be mounted on the cabin roof near the second cushion portion by one end thereof and connected, across the second cushion portion and the first cushion portion, to the lower end of the first diaphragm cushion by the other end thereof, and the second diaphragm tether may be mounted on the cabin roof near the first cushion portion by one end thereof and connected, across the first cushion portion and the second cushion portion, to the lower end of the second diaphragm cushion by the other end thereof. Thus, the first diaphragm tether and the second diaphragm tether may cross each other.

The first cushion portion may be composed of a first outer cushion portion that is extended along the rim and is inflated when deployed and a first dead portion that forms an inner lateral surface of the first outer cushion portion and is non-inflatable, and the second cushion portion may be composed of a second outer cushion portion that is extended along the rim and is inflated when deployed and a second dead portion that forms an inner lateral surface of the second outer cushion portion and is non-inflatable.

The third cushion portion may be composed of a third outer cushion portion that is extended along the rim and is in communication with the first outer cushion portion of the first cushion portion and with the second outer cushion portion of the second cushion portion and a third dead portion that forms an inner lateral surface of the third outer cushion portion and is non-inflatable.

The third cushion portion may be provided in such a manner that the third dead portion is divided into one side dead zone and the other side dead zone by a center cushion portion as the center cushion portion is extended horizontally across the third dead portion from the third outer cushion portion.

According to the roof airbag apparatus for mobility with above-described structure, it is possible to protect the occupant seated in the cabin in such a manner that the roof airbag is deployed downward from the cabin roof, and the occupant is safely protected from impact in such a manner that the occupant is securely restrained by the airbag as the deployment shape of the airbag is maintained.

DETAILED DESCRIPTION

Figure 1:
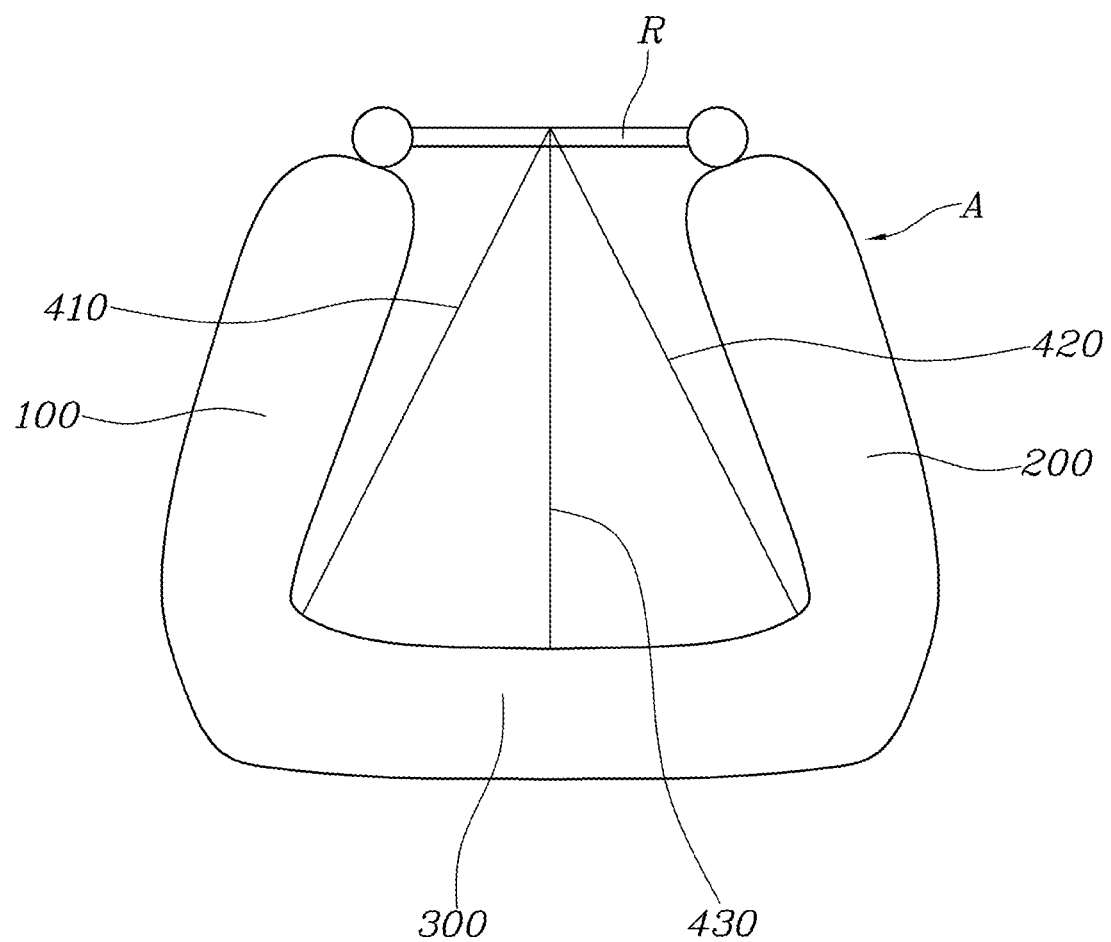
FIG. 1 is a drawing to illustrate a roof airbag apparatus for a vehicle according to an exemplary embodiment of the present disclosure.

Hereinafter, the present disclosure will be described in detail by describing disclosed embodiments of the present specification with reference to the accompanying drawings. However, regardless of the reference character, the same or similar constituent elements shall be given the same reference number and the redundant descriptions shall be omitted.

The suffixes "module" and "unit" for the constituent elements used in the descriptions below are given or mixed with the ease of the specification describing, and do not have any distinctive meaning or role in itself each other.

In describing the embodiments of the present specification, if a specific description of the related prior art is deemed to obscure the essential points of the embodiments of the present specification, the detailed description will be omitted. In addition, the accompanying drawings are intended to facilitate the understanding of the embodiments set forth in the present specification, not to limit the technical idea of the present specification by the accompanying drawings. All alterations, equivalents, and substitutes that are included within the technical idea of the present disclosure should be understood as falling within the scope of the present disclosure.

The terms first, second, and so on may be used to describe various constituent elements, but should not be construed to impose any limitation on the meanings of the constituent elements. These terms are only used to distinguish one constituent element from another.

It should be understood that a constituent element, when referred to as being "connected to" or "coupled to" a different constituent element, may be directly connected to or directly coupled to the different constituent element or may be coupled to or connected to the different constituent element with a third constituent element in between. In contrast, it should be understood that a constituent element, when referred to as being "directly coupled to" or "directly connected to" a different constituent element, is coupled to or connected to the different constituent element without a third constituent element in between.

A noun in singular form has the same meaning as when used in plural form unless it has a different meaning in context.

It should be understood that, throughout the present specification, the term "include," "have," or the like is intended to indicate that a feature, a number, a step, an operation, a constituent element, a component, or a combination thereof is present, without precluding the possibility that one or more other features, numbers, steps, operations, constituent elements, components or a combination thereof will be present or added.

Figure 2:
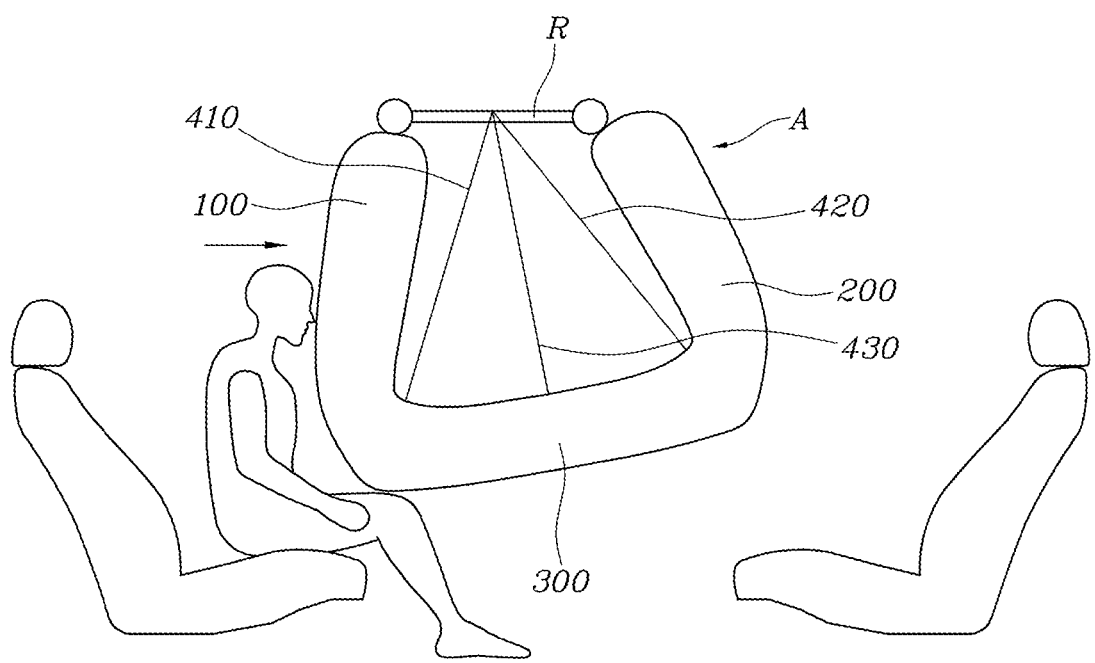
FIG. 2 is a drawing to describe the roof airbag apparatus a vehicle according to an exemplary embodiment illustrated in FIG. 1.

FIG. 1 is a drawing to illustrate a roof airbag apparatus for a vehicle according to an exemplary embodiment of the present disclosure, and FIG. 2 is a drawing to describe the roof airbag apparatus for a vehicle according to an exemplary embodiment illustrated in FIG. 1.

Figure 3:
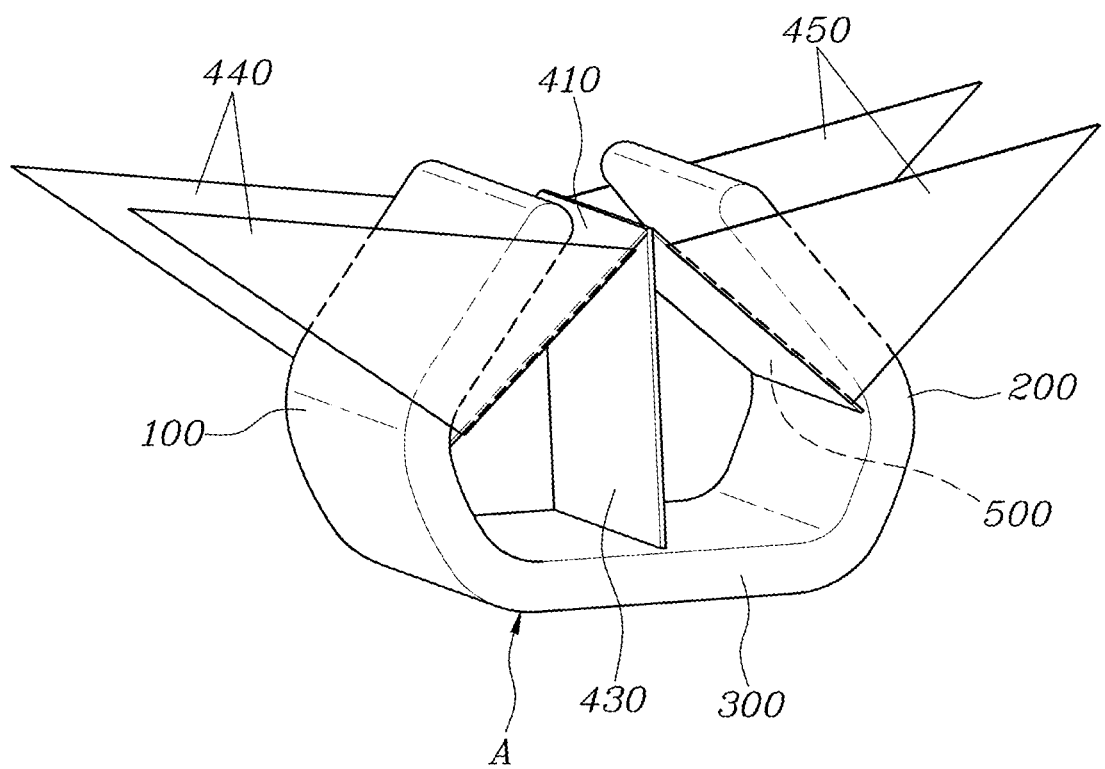
FIG. 3 is a drawing to illustrate the roof airbag apparatus for a vehicle according to another exemplary embodiment of the present disclosure.
Figure 4:
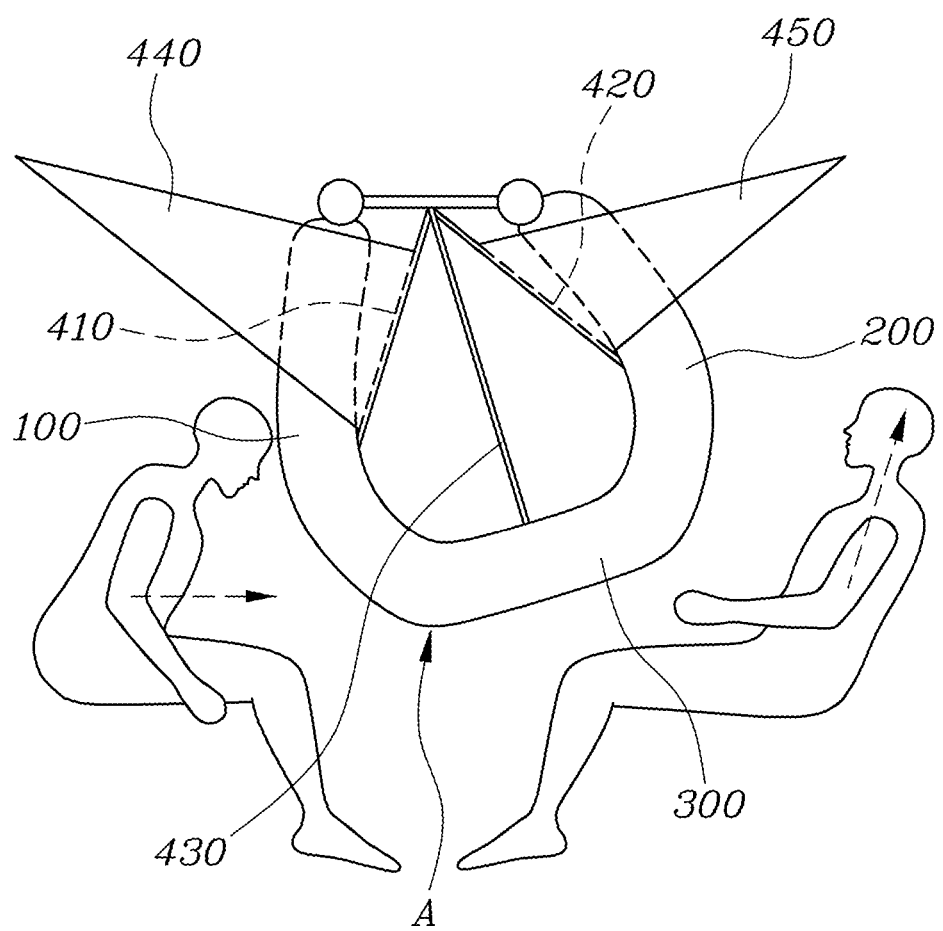
FIG. 4 is a drawing to describe the roof airbag apparatus for a vehicle according to another exemplary embodiment illustrated in FIG. 3.

FIG. 3 is a drawing to illustrate the roof airbag apparatus for a vehicle according to another exemplary embodiment of the present disclosure, and FIG. 4 is a drawing to describe the roof airbag apparatus for a vehicle according to another exemplary embodiment illustrated in FIG. 3.

Figure 5:
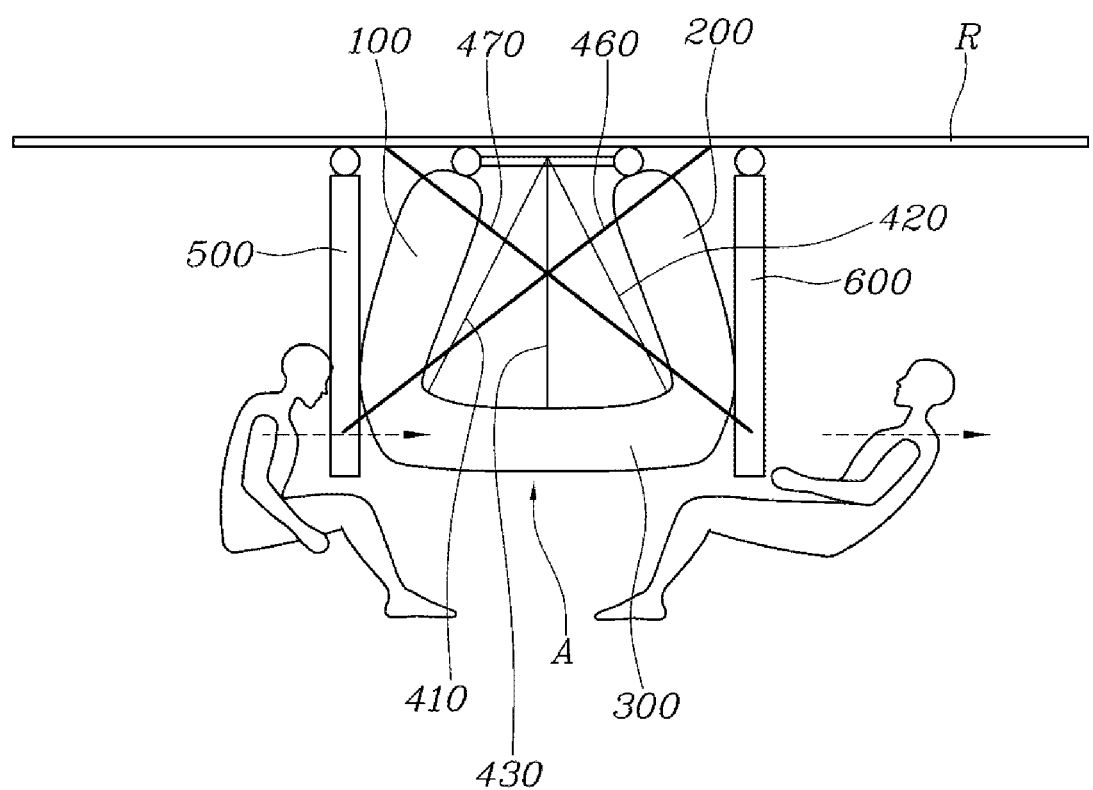
FIG. 5 is a drawing to illustrate the roof airbag apparatus for a vehicle according to still another exemplary embodiment of the present disclosure.
Figure 6:
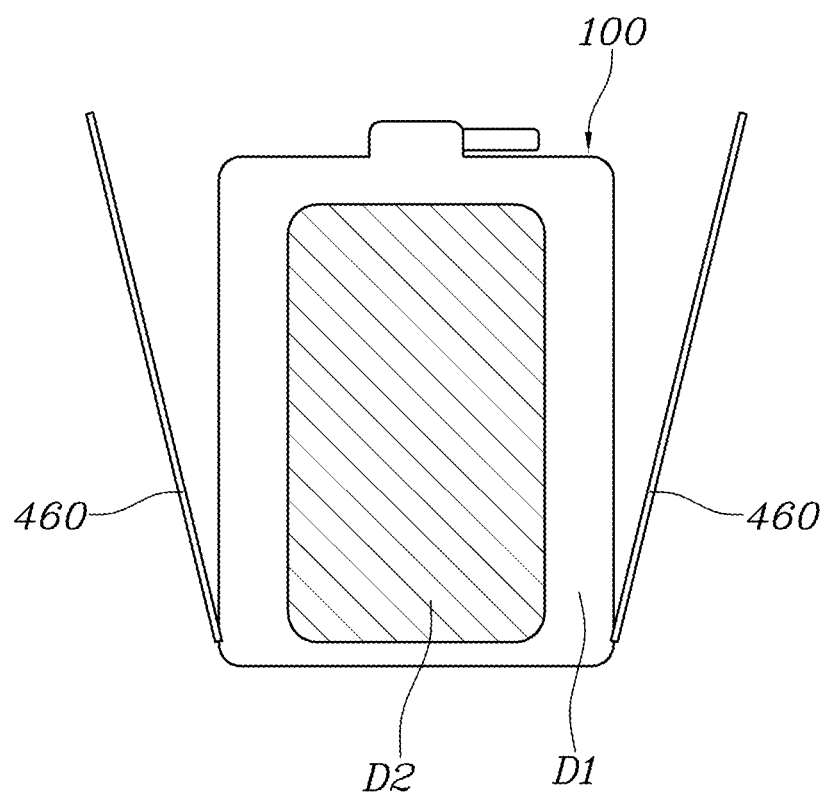
FIG. 6 is a drawing to describe the roof airbag apparatus for a vehicle according to still another exemplary embodiment illustrated in FIG. 5.

FIG. 5 is a drawing to illustrate the roof airbag apparatus for a vehicle according to still another exemplary embodiment of the present disclosure, and FIG. 6 is a drawing to describe the roof airbag apparatus for a vehicle according to still another exemplary embodiment illustrated in FIG. 5.

Figure 7:
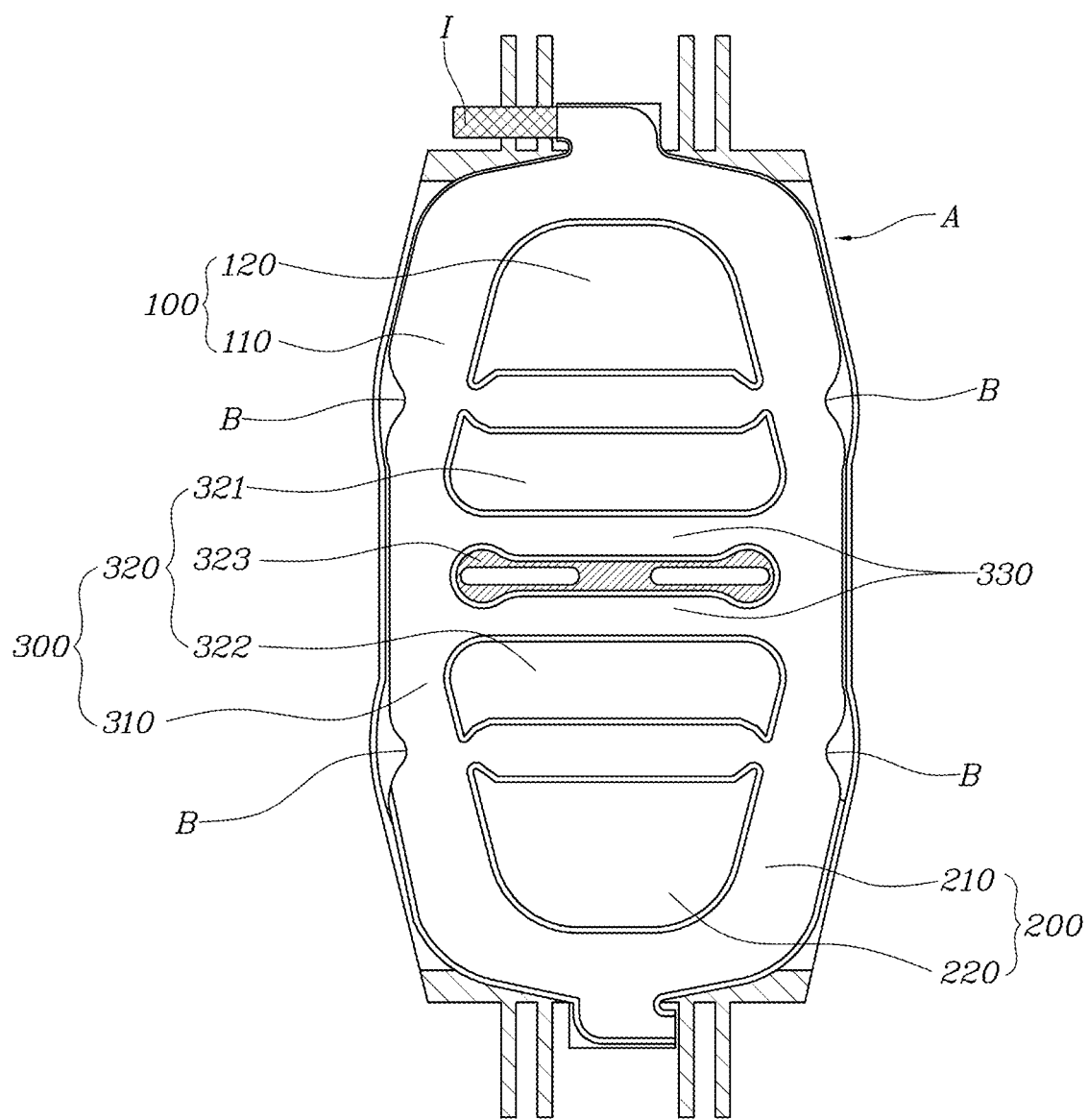
FIG. 7 is a drawing to illustrate a roof airbag according to the present disclosure.

FIG. 7 is a drawing to illustrate a roof airbag according to the present disclosure.

As illustrated in FIGS. 1 to 2, the roof airbag apparatus for a vehicle according to the present disclosure includes: a first cushion portion 100 that is connected (or coupled) to a cabin roof R and is deployed downward from the cabin roof R when inflated; a second cushion portion 200 that is connected to the cabin roof R in a manner that is spaced apart from the first cushion portion 100 and is deployed downward from the cabin roof R when inflated; and a third cushion portion 300 that maintains a deployment shape of the first cushion portion 100 and the second cushion portion 200, when inflated, by being connected to (in communication with) the first cushion portion 100 and the second cushion portion 200 in a manner that is extended therebetween in a facing direction of the first cushion portion 100 and the second cushion portion 200.

The roof airbag A according to the present disclosure is coupled to and/or mounted on the cabin roof R and protects an occupant in a manner that is deployed downward from the roof R upon receiving gas supplied from an inflator I. Accordingly, the roof airbag A, when deployed, may be arranged between a plurality of seats provided in the cabin.

As shown in FIG. 1, the roof airbag A of the present disclosure is composed of the first cushion portion 100, the second cushion portion 200, and the third cushion portion 300, wherein the first cushion portion 100, the second cushion portion 200, and the third cushion portion 300 are inflated by sharing the gas supplied by the inflator I. These first cushion portion 100, second cushion portion 200, and third cushion portion 300 are formed in different shapes or different sizes depending on the protection coverage of the occupant.

That is, the first cushion portion 100 and the second cushion portion 200 are connected to the cabin roof R, and they are deployed downward when inflated. These first cushion portion 100 and second cushion portion 200 are arranged in such a manner as to be spaced apart from each other and are interconnected by the medium of the third cushion portion 300. Accordingly, the roof airbag A according to the present disclosure, when inflated, maintains a deployment shape and deployment position of the first cushion portion 100 and the second cushion portion 200 using the third cushion portion 300 as the third cushion portion 300 becomes inflated after the first cushion portion 100 and the second cushion portion 200 are deployed downward. Consequently, the first cushion portion 100 and the second cushion portion 200 are prevented from being abnormally deployed and the occupant protection may be performed thereby.

Here, the third cushion portion 300 is connected in communication with edge ends of the first cushion portion 100 and the second cushion portion 200. As a result, at the roof airbag A while being deployed, the first cushion portion 100 and the second cushion portion 200 are inflated using the gas from the inflator I, and the third cushion portion 300 is inflated by the gas being supplied through the first cushion portion 100 and the second cushion portion 200.

Accordingly, the first cushion portion 100 and the second cushion portion 200 may secure speedy deployment, and the deployment shape and deployment position of the first cushion portion 100 and the second cushion portion 200 are maintained as the third cushion portion 300 is inflated after the first cushion portion 100 and the second cushion portion 200 are deployed. Consequently, the first cushion portion 100 and the second cushion portion 200 may be deployed precisely in position.

In addition, the third cushion portion 300, when inflated, is formed longer than a separation distance between the first cushion portion 100 and the second cushion portion 200 in the cabin roof R.

That is, when the first cushion portion 100 and the second cushion portion 200 are mounted on the cabin roof R, the separation distance between installation positions of the first cushion portion 100 and the second cushion portion 200, respectively, is shorter than the inflated length of the third cushion portion 300. Thus, the first cushion portion 100 and the second cushion portion 200 are arranged in a manner that become spaced apart from each other in a diagonal direction by the third cushion portion 300 as the first cushion portion 100 and the second cushion portion 200 are completely deployed.

Consequently, when the occupant is loaded onto either the first cushion portion 100 or the second cushion portion 200 due to the mobility collision, the upper body of the occupant may be securely supported with the deployed first cushion portion 100 and the deployed second cushion portion 200 that are diagonally arranged. Furthermore, the third cushion portion 300 provides support for either the first cushion portion 100 or the second cushion portion 200, and thus the occupant loaded onto either the first cushion portion 100 or the second cushion portion 200 may be safely protected in a manner that is securely restrained thereby.

That is, in a case where a mobility collision occurs and the occupant is loaded onto the first cushion portion 100, the first cushion portion 100 is in contact with the upper body of the occupant, and the third cushion portion 300 is in contact with the lower body of the occupant. Thus, the upper body and lower body of the occupant are supported by the first cushion portion 100 and the third cushion portion 300, resulting in being securely restrained.

Meanwhile, a deflection guide B is formed on the connection areas between the first cushion portion 100 and the third cushion portion 300 and between the second cushion portion 200 and the third cushion portion 300 in such a manner that a rim is dented inward therewith.

As shown in FIG. 2, the deflection guides B are formed on the connection areas between the first cushion portion 100 and the third cushion portion 300 and between the second cushion portion 200 and the third cushion portion 300 along the rims of the first cushion portion 100, the second cushion portion 200, and the third cushion portion 300. Thus, the roof airbag A may perform deflection transforming in such a manner that the third cushion portion 300 is deflected, starting from the deflection guide B thereof, at the first cushion portion 100 and the second cushion portion 200.

Here, the deflection guide B is formed in such a manner that the rim of the roof airbag A is dented inward, and the third cushion portion 300 is deformed to be deflective, starting from the deflection guide B thereof, at the first cushion portion 100 and the second cushion portion 200. And thus, the roof airbag A is constructed in such a manner that the upper body of the occupant is supported by the first cushion portion 100 and the second cushion portion 200 and that the lower body of the occupant is supported by the third cushion portion 300.

Meanwhile, in the present disclosure, various exemplary embodiments may be applied to guide the deployment of the roof airbag.

As an exemplary embodiment shown in FIGS. 1 to 2, the present disclosure further includes: a first tether 410, wherein one end is connected to the cabin roof R and the other end is connected to the third cushion portion 300 toward the first cushion portion 100; a second tether 420, wherein one end is connected to the cabin roof and the other end is connected to the third cushion portion toward the second cushion portion; and a third tether 430, wherein one end is connected to the cabin roof and the other end is connected to the third cushion portion 300 between the first tether 410 and the second tether 420.

In this way, the first tether 410 and the second tether 420 are provided in the roof airbag A. The first tether 410 and the second tether 420 are connected to the cabin roof R and the third cushion portion 300 and guide a deployment shape of the roof airbag A. Accordingly, the third cushion portion 300 is restricted to the length of the first tether 410 and the second tether 420 in being deployed to prevent it from sagging down, and the third cushion portion 300 is guided into the proper deployment shape therewith. Thus, the first cushion portion 100 and the second cushion portion 200 are supported by the third cushion portion 300 in the deployment shaping and positioning so as to be surely deployed.

In addition, the other ends of the first tether 410 and the second tether 420 are connected to the third cushion 300, respectively, in a manner that are adjacent to the first cushion portion 100 and the second cushion portion 200, and thus the third cushion portion 300 is guided into the deflecting shape at the first cushion portion 100 and the second cushion portion 200. As a result, the roof airbag A may be deployed in such a manner that the third cushion portion 300 is deflected, when inflated, at the first cushion portion 100 and the second cushion portion 200, respectively.

Meanwhile, one end of the third tether 430 is connected to the cabin roof R, and the other end of the third tether 430 is connected to the third cushion portion 300 in a manner that is located between the first tether 410 and the second tether 420. Thus, the third cushion portion 300 is guided into the inflating shape.

In this way, the third tether 430 is connected to the center of the third cushion portion 300 and guides the third cushion portion 300 not to be moved toward any one side. Thus, the first cushion portion 100 and the second cushion portion 200 connected to the third cushion portion 300 may be deployed to the proper position as designed.

Meanwhile, as another exemplary embodiment illustrated in FIGS. 3 to 4, the present disclosure further includes: a first hug tether 440 that is mounted on the cabin roof R in a manner that is spaced apart from the first cushion portion 100 and is extended in a manner that encloses an inner side of the first cushion portion 100; and a second hug tether 450 that is mounted on the cabin roof R in a manner that is spaced apart from the second cushion portion 200 and is extended in a manner that encloses an inner side of the second cushion portion 200.

For this reason, the variation in the deployed position of the roof airbag A may be minimized by the first hug tether 440 and the second hug tether 450.

Particularly, the first hug tether is formed to enclose the inner side of the first tether and is connected thereto, and the second hug tether is formed to enclose the inner side of the second tether and may be connected thereto.

That is, the first hug tether 440 is mounted on the cabin roof R in a manner that is spaced apart toward one side of the first cushion portion 100 and is extended in a manner that encloses the inner side of the first cushion portion 100. Thus, the roof airbag A is restrained from being moved to the other side by a pulling force generated when the roof airbag A moves excessively to the other side.

In addition, the second hug tether 450 is mounted on the cabin roof R in a manner that is spaced apart toward the other side of the second cushion portion 200 of the roof airbag A and is extended in a manner that encloses the inner side of the second cushion portion 200. Thus, the roof airbag A is restrained from being moved to one side by a pulling force generated when the roof airbag A moves to one side.

In this way, in a case where mobility collision occurs in the rear side, i.e. the other side direction as illustrated in FIG. 4, the roof airbag A attempting to be moved to the other side by the impact inertia is restrained from being moved by the first hug tether 440, and thus the occupant seated in one side may be protected by the roof airbag A.

Like this, the variation in the deployed position of the roof airbag A may be minimized by the first hug tether 440 and the second hug tether 450, and thus the occupant protection performance of the roof airbag A is secured.

Meanwhile, the first hug tether 440, while enclosing the inner side of the first cushion portion 100, is extended toward one side in such a manner that the width thereof becomes gradually wider, and both ends of the first hug tether 440 are mounted on the cabin roof R. The second hug tether 450, while enclosing the inner side of the second cushion portion 200, is extended toward the other side in such a manner that the width thereof becomes gradually wider, and both ends of the second hug tether 450 may be mounted on the cabin roof R.

Here, the first hug tether 440 is configured to enclose the inner side of the first tether 410 and is connected thereto, and the second hug tether 450 is configured to enclose the inner side of the second tether 420 and is connected thereto.

That is, the first hug tether 440 is extended from the first cushion portion 100 in such a manner as to enclose the first tether 410, and thus the pulling force is applied to the first tether 410. Therefore, the first hug tether 440 maintains the shape of the first cushion portion 100 that is connected to the first tether 410. In addition, the second hug tether 450 is extended from the second cushion portion 200 in such a manner as to enclose the second tether 420, and thus the pulling force is applied to the second tether 420. Therefore, the second hug tether 450 maintains the shape of the second cushion portion 200 that is connected to the second tether 420.

As an example, in a case where mobility collision occurs in the rear side, i.e. the other side direction, the roof airbag A is moved to the other side by the impact inertia. On this occasion, the first hug tether 440, while being connected to the first tether 410, generates the pulling force toward one side that is opposite to the moving direction of the roof airbag A. Thus, the first cushion portion 100 connected to the first tether 410 is restrained from being moved to the other side. In addition, the moving force toward the other side is applied to the second cushion portion 200 by the inertia, and thus the third cushion portion 300 is lifted in the direction in which the second cushion portion 200 is to be moved. As a result, the occupant seated in the other side, when thrown out toward one side after the mobility collision, is to be in contact with the second cushion portion 200, and thus the safety protection is provided to the occupant also seated in the other side.

In this way, the first hug tether 440 and the second hug tether 450 are connected to enclose the first tether 410 and the second tether 420, respectively. And thus, the movement of the roof airbag A is controlled, and the shape deflection of the roof airbag A is guided also, resulting in stable protection for the occupant.

As described, the first hug tether 440, while enclosing the inner side of the first cushion portion 100, is extended toward one side in such a manner that the width thereof becomes gradually wider, and both ends of the first hug tether 440 are mounted on the cabin roof. The second hug tether 450, while enclosing the inner side of the second cushion portion 200, is extended toward the other side in such a manner that the width thereof becomes gradually wider, and both ends of the second hug tether 450 may be mounted on the cabin roof.

In this way, the first hug tether 440 and the second hug tether 450 are configured to become gradually wider in width in the direction of moving away from roof airbag A, and thus the occupant does not interfere with the first hug tether 440 and the second hug tether 450 when roof airbag A is deployed. In addition, when the occupant, loaded onto the roof airbag A after the mobility collision, moves in the lateral direction of the roof airbag A, the occupant is restrained by the first hug tether 440 and the second hug tether 450, and thus the occupant is not moved out of the protection coverage of the roof airbag A.

Meanwhile, as another exemplary embodiment illustrated in FIGS. 5 to 6, the present disclosure may further include: a first diaphragm cushion 500 that is deployed with a shape blocking the first cushion portion 100 from the outer side of the first cushion portion 100; and a second diaphragm cushion 600 that is deployed with a shape blocking the second cushion portion 200 from the outer side of the second cushion portion 200.

In addition, the present disclosure may further include: a first diaphragm tether 460 that is connected to the cabin roof R by one end and is connected to a lower end of the first diaphragm cushion 500 by the other end thereof; a second diaphragm tether 470 that is connected to the cabin roof R by one end and is connected to a lower end of the second diaphragm cushion 600 by the other end thereof.

In this way, according to the present disclosure, the first diaphragm cushion 500 is deployed downward from the cabin roof R to the space between a front seat and the first cushion portion 100, and the second diaphragm cushion 600 is deployed downward from the cabin roof R to the space between a rear seat and the second cushion portion 200.

In addition, the first diaphragm tether 460 and the second diaphragm tether 470 are connected to the first diaphragm cushion 500 and the second diaphragm cushion 600, respectively, and thus support the corresponding diaphragm cushions in a case where passengers are loaded onto the first diaphragm cushion 500 or the second diaphragm cushion 600 due to the mobility collision.

That is, in a mobility collision, if body movement of the occupant rushes momentarily toward the direction of the impact, and the occupant is loaded onto either the first diaphragm cushion 500 or the second diaphragm cushion 600, the loaded diaphragm cushion is supported by the first diaphragm tether 460 or the second diaphragm tether 470, thereby absorbing the load of the passengers considerably.

Accordingly, under a reduced load of the passengers, the first diaphragm cushion 500 or the second diaphragm cushion 600 is supported against the first cushion portion 100 or the second cushion portion 200. And thus, excessive movement of the roof airbag A resulting from the occupant movement is prevented, and the occupant is safely restrained and is protected accordingly.

These first diaphragm cushion 500 and second diaphragm cushion 600 may be formed in a flat square cushion shape, and be deployed downward directly in a manner that stand between the occupant and each cushion portion.

In addition, the first diaphragm cushion 500 and the second diaphragm cushion 600 are configured to have a fill chamber D1 deployed in a gas-filled shape along the rim thereof, and a non-deploying dead zone D2 may be formed therewith in such a manner that no gas is filled in the center thereof.

That is, the fill chamber D1 is formed along the rims of the first diaphragm cushion 500 and the second diaphragm cushion 600, and the non-deploying dead zone D2 is formed in the center of the first diaphragm cushion 500 and the second diaphragm cushion 600, respectively. And thus, the first diaphragm cushion 500 and the second diaphragm cushion 600 are provided in a shape where the fill chamber D1 only is filled with gas. As a result, the first diaphragm cushion 500 and the second diaphragm cushion 600 may secure speedy deployment.

Meanwhile, the first diaphragm tether 460 is provided in such a manner that one end thereof is mounted on the cabin roof R near the second cushion portion 200 and that the other end is connected, across the second cushion portion 200 and the first cushion portion 100, to the lower end of the first diaphragm cushion 500. The second diaphragm tether 470 is provided in such a manner that one end thereof is mounted on the cabin roof R near the first cushion portion 100 and that the other end thereof is connected, across the first cushion portion 100 and the second cushion portion 200, to the lower end of the second diaphragm cushion 600. Thus, the first diaphragm tether 460 and the second diaphragm tether 470 may cross each other.

Accordingly, in case of a collision at the front of the vehicle, the body of the occupant seated in the rear seat moves toward the front of the vehicle by inertia and is loaded onto the second diaphragm cushion 600.

The second diaphragm cushion 600 is then moved forward by the load of the occupant and is supported by the second cushion portion 200, and the first cushion portion 100 together with the second cushion portion 200 is supported by the first diaphragm cushion 500.

On this occasion, the first diaphragm cushion 500 is restricted from moving forward in a manner that is supported by the first diaphragm tether 460, which in turn prevents the roof airbag A from moving in the direction of the collision.

These first diaphragm tether 460 and second diaphragm tether 470 may be connected to areas that are not in contact with the occupant.

For example, the first diaphragm tether 460 is, starting from the first diaphragm cushion 500, connected to the cabin roof R near the second cushion portion 200, and thus the first diaphragm tether 460 spreads out without contact not only with passengers seated in the front seat, but also with passengers seated in the rear seat during the deployment process of the first diaphragm cushion 500.

Likewise, the second diaphragm tether 470 is, starting from the second diaphragm cushion 600, connected to the cabin roof R near the first cushion portion 100, and thus the second diaphragm tether 470 spreads out without contact not only with passengers seated in the rear seat, but also with passengers seated in the front seat during the deployment process of the second diaphragm cushion 600.

In this way, when each diaphragm tether is deployed, the first diaphragm tether 460 and the second diaphragm tether 470 promptly support the first diaphragm cushion 500 and the second diaphragm cushion 600 in a manner that avoid being interfered with by the passenger. Thus, the passenger load on each diaphragm cushion may be stably reduced.

Meanwhile, as illustrated in FIG. 7, the first cushion portion 100 is composed of a first outer cushion portion 110, which is extended along the rim and is inflated when deployed, and a first dead portion 120, which forms an inner lateral surface of the first outer cushion portion 110 and is non-inflatable. The second cushion portion 200 is composed of a second outer cushion portion 210, which is extended along the rim and is inflated when deployed, and a second dead portion 220, which forms an inner lateral surface of the second outer cushion portion 210 and is non-inflatable.

That is, an inflating zone and a non-inflating zone are distinguished in the first cushion portion 100 and the second cushion portion 200.

In detail, the first outer cushion portion 110, as an inflating zone of the first cushion portion 100, is extended along the rim in the first cushion portion 100, and the second outer cushion portion 210, as an inflating zone of the second cushion portion 200, is extended along the rim in the second cushion portion 200.

In addition, the first dead portion 120, as a non-inflating zone of the first cushion portion 100, is formed on the inner side of the first outer cushion portion 110 in the first cushion portion 100, and the second dead portion 220, as a non-inflating zone the second cushion portion 200, is formed on the inner side of the second outer cushion portion 210 in the second cushion portion 200.

Therefore, the roof airbag A is inflated in the first outer cushion portion 110 and the second outer cushion portion 210 only, which form the rims in the first cushion portion 100 and the second cushion portion 200, respectively. Thus, inflating speed is secured, and the deployment shape of the roof airbag A may be maintained. In addition, when the roof airbag A is inflated, the first dead portion 120 of the first cushion portion 100 or the second dead portion 220 of the second cushion portion 200 is in contact with the upper body of the occupant, and the third cushion portion 300, along with the lower portions of the first outer cushion portion 110 and the second outer cushion portion 210, is in contact with the lower body of the occupant. Thus, the upper body and the lower body of the occupant are supported by each cushion portion, resulting in being securely restrained.

Here, the third cushion portion 300 is composed of a third outer cushion portion 310 and a third dead portion 320. The third outer cushion portion 310 is extended along the rim and is in communication with the first outer cushion portion 110 of the first cushion portion 100 and with the second outer cushion portion 210 of the second cushion portion 200, and the third dead portion 320 forms an inner lateral surface of the third outer cushion portion 310 and is non-inflatable.

In this way, the third cushion portion 300 is composed of the third outer cushion portion 310 and the third dead portion 320, and the third outer cushion portion 310 is in communication with the first outer cushion portion 110 of the first cushion portion 100 and with the second outer cushion portion 210 of the second cushion portion 200. Thus, the third cushion portion 300 is inflated in a manner that receives gas through the first outer cushion portion 110 and the second outer cushion portion 210. That is, the third cushion portion 300 is finally inflated after the first cushion portion 100 and the second cushion portion 200 are inflated. Thus, the deployment shape and deployment position of the first cushion portion 100 and the second cushion portion 200, respectively, are normalized by the third cushion portion 300.

In addition, the third cushion portion 300 is inflated only in the third outer cushion portion 310, which results from the non-inflating zone formed by the third dead portion 320, and thus the inflating speed is secured.

Meanwhile, the third cushion portion 300 is provided in such a manner that the third dead portion 320 is divided into one side dead zone 321 and the other side dead zone 322 by the center cushion portion 330 as the center cushion portion 330 is extended horizontally across the third dead portion 320 from the third outer cushion portion 310.

That is, the center cushion portion 330 is, as an inflating zone in the third cushion portion 300, connected to the third outer cushion portion 310 and inflated with supplied gas from the third outer cushion portion 310. This center cushion portion 330, along with the third outer cushion portion 310, maintains the deployment shape of the third cushion portion 300 by inflation force. This center cushion portion 330 may be smaller in diameter than the third outer cushion portion 310.

In addition, the center cushion portion 330 is extended across the third dead portion 320. Thus, the third dead portion 320 of the third cushion portion 300 is divided into one side dead zone 321 and the other side dead zone 322.

The apparatus for the roof airbag A for a vehicle with above-described structure protects the occupant seated in the cabin in such a manner that the roof airbag A is deployed downward from the cabin roof R, and the occupant is safely protected from impact in such a manner that the occupant is securely restrained by the airbag as the deployment shape of the airbag is maintained.

Although the specific exemplary embodiments of the disclosure have been shown and described, it will be apparent to those skilled in the art that the present disclosure may be variously improved and changed without departing from the technical spirit of the present disclosure provided by the appended claims.

What is claimed is:

1. A roof airbag for a vehicle, comprising:
   a first cushion coupled to a first portion of a cabin roof of a vehicle and configured to deploy downwardly from the cabin roof when inflated;
   a second cushion coupled to a second portion of the cabin roof spaced apart from the first portion of the cabin roof and configured to deploy downwardly from the cabin roof when inflated; and
   a third cushion coupled to and extending between the first and second cushions and configured to maintain a deployment shape of the first and second cushions when the roof airbag is inflate;
   wherein the first and second cushions include:
   an outer cushion portion extending along a rim of the first and second cushions and configured to be inflated; and
   a non-inflatable portion configured to function as an inner surface of the first and second cushions.

2. The roof airbag of claim 1, wherein the third cushion, when inflated, is greater in length than a distance between the first and second portions of the cabin roof.

3. The roof airbag of claim 1, wherein the third cushion is connected to lower ends of the first and second cushions.

4. The roof airbag of claim 1, further comprising a deflection guide positioned at a first connection area between the first and third cushions and a second connection area between the second and third cushions.

5. The roof airbag of claim 1, further comprising:
   a first tether having a first end connected to the cabin roof and a second end connected to a first portion of the third cushion positioned closer to the first cushion than to the second cushion; and
   a second tether having a first end connected to the cabin roof and a second end connected to a second portion of the third cushion positioned closer to the second cushion than to the first cushion.

6. The roof airbag of claim 5, further comprising a third tether having a first end connected to the cabin roof and a second end connected to a third portion of the third cushion positioned between the first and second portions of the third cushion.

7. The roof airbag of claim 5, further comprising:
a first hug tether coupled to a third portion of the cabin roof spaced apart from the first portion of the cabin roof and configured to at least partially cover an inner side of the first cushion; and
a second hug tether coupled to a fourth portion of the cabin roof spaced apart from the second portion of the cabin roof and configured to at least partially cover an inner side of the second cushion.

8. The roof airbag of claim 7, wherein:
the first hug tether is coupled to the inner side of the first tether, and
the second hug tether is coupled to the inner side of the second tether.

9. The roof airbag of claim 8, wherein:
the first hug tether has both ends coupled to the cabin roof and becomes gradually wider as extending away from the both ends of the first hug tether, and
the second hug tether has both ends coupled to the cabin roof and becomes gradually wider as extending away from the both ends of the second hug tether.

10. The roof airbag of claim 1, further comprising:
a first diaphragm cushion configured, when deployed, to cover an outer side of the first cushion; and
a second diaphragm cushion configured, when deployed, to cover an outer side of the second cushion.

11. The roof airbag of claim 10, wherein the first and second diaphragm cushions include:
a fill chamber extending along a rim of the first and second diaphragm cushions and being filled with a gas; and
a no-fill zone positioned at a center portion of the first and second diaphragm cushions and not being filled with the gas.

12. The roof airbag of claim 10, further comprising:
a first diaphragm tether having a first end coupled to the cabin roof and a second end coupled to a lower end of the first diaphragm cushion; and
a second diaphragm tether having a first end coupled to the cabin roof and a second end coupled to a lower end of the second diaphragm cushion.

13. The roof airbag of claim 12, wherein:
the first diaphragm tether has (1) a first end connected to a third portion of the cabin roof near the second portion of the cabin roof and (2) a second end connected to the lower end of the first diaphragm cushion, and extends across the first and second cushions,
the second diaphragm tether has (1) a first end connected to a fourth portion of the cabin roof near the first portion of the cabin roof and (2) a second end connected to the lower end of the second diaphragm cushion, and extends across the first and second cushions, and
the first and second diaphragm tethers cross each other.

14. The roof airbag of claim 1, wherein the third cushion includes:
an outer cushion portion extending along a rim of the third cushion and connected to the outer cushion portions of the first and second cushions; and
a non-inflatable portion surrounded by the outer cushion portion of the third cushion and configured to function as an inner surface of the third cushion.

15. The roof airbag of claim 14, wherein:
the third cushion includes a center cushion portion laterally extending across the non-inflatable portion of the third cushion, and
the non-inflatable portion of the third cushion is divided into first and second non-inflatable zones by the center cushion portion positioned therebetween.

16. A roof airbag for a vehicle, comprising:
a first cushion coupled to a first portion of a cabin roof of a vehicle and configured to deploy downwardly from the cabin roof when inflated into a first area for engaging and cushioning a head and chest of a first vehicle occupant;
a second cushion coupled to a second portion of the cabin roof spaced apart from the first portion of the cabin roof and configured to deploy downwardly from the cabin roof when inflated into a second area for engaging and cushioning a head and chest of a second vehicle occupant;
a third cushion coupled to and extending between the first and second cushions and configured to maintain a deployment shape of the first and second cushions when the roof airbag is inflated;
a first tether having a first end connected to the cabin roof in a fully deployed state and a second end extending into the first area and connected to a first portion of the third cushion positioned closer to the first cushion than to the second cushion; and a second tether having a first end connected to the cabin roof in a fully deployed state and a second end extending into the second area and connected to a second portion of the third cushion positioned closer to the second cushion than to the first cushion.

17. The roof airbag of claim 16, wherein the first and second tethers extend through an empty space between the first and second cushions.

18. The roof airbag of claim 16, wherein the roof airbag, when deployed, is arranged between a plurality of seats that face each other in the vehicle.

19. The roof airbag of claim 16, wherein the third cushion comprises an outer cushion portion around a periphery of the third cushion that is inflatable and an inner cushion portion.

20. The roof airbag of claim 19, wherein the inner cushion portion of the third cushion comprises two non-inflatable side zones separated by an inflatable center cushion portion.

* * * * *